Feb. 27, 1962 D. O. McCALL 3,022,759
CONCRETE FLOATING WHARF
Filed Aug. 19, 1959 2 Sheets-Sheet 1
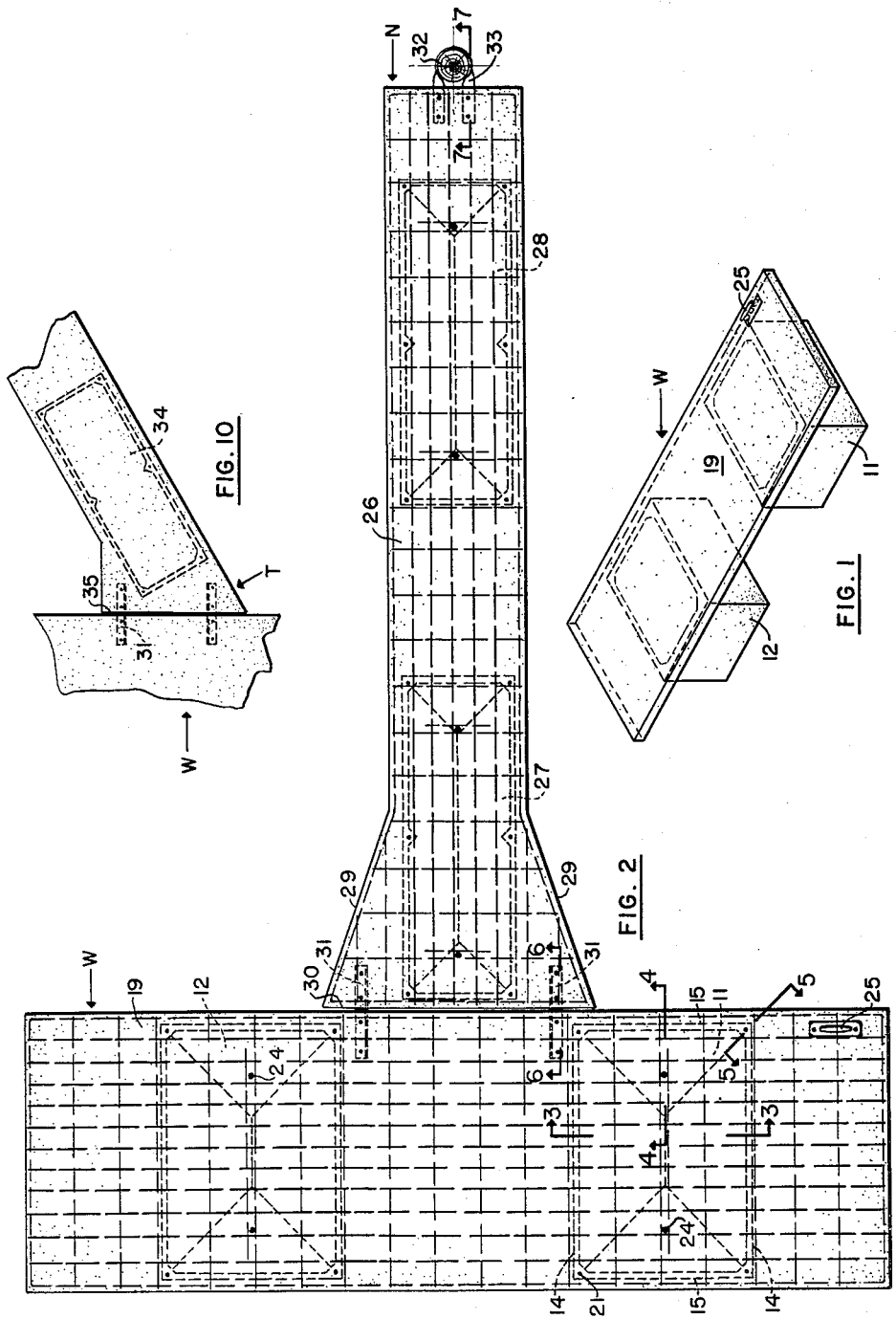

Feb. 27, 1962

D. O. McCALL 3,022,759

CONCRETE FLOATING WHARF

Filed Aug. 19, 1959

United States Patent Office 3,022,759
Patented Feb. 27, 1962

3,022,759
CONCRETE FLOATING WHARF
Donald O. McCall, Napa, Calif., assignor to Basalt Rock Company, Inc., Napa, Calif., a corporation of California
Filed Aug. 19, 1959, Ser. No. 834,839
7 Claims. (Cl. 114—.5)

This invention relates to floating wharf structures comprising one or more float units constructed essentially of reinforced concrete, the said units being adapted to float in the water and to be joined together to form a composite wharf of any desired size and configuration and providing a continuous deck or walk-way.

Floating wharfs made of reinforced concrete float units are known; see, for example, U.S. Patent No. 2,857,872 to Usab. Floating wharfs constructed of concrete are well suited to resist the deteriorating action of water, especially salt water. Prior composite wharfs of this type employed essentially rigid float units in which the immersed parts were, for the greater part, longitudinally co-extensive with the units. These units were united by tie rails, brackets, or the like, to form wharfs of the required outline for berthing boats at one or more fingers or piers extending over the water. To minimize the number of such units in a given installation it is desirable to fabricate them to the greatest lengths consistent with the limitations imposed by available means of transportation from the casting or fabrication plant to the site of installation.

As the size of such rigid units is increased the stress imposed theron by wave action increases and this necessitates increasingly heavy and, hence, expensive construction. Also, the union of a considerable number of such float units causes a significant obstruction to the flow of water, resulting in lateral stress on the wharf. The provision of adequate gaps or spaces between the immersed pontoons has, however, been impracticable with the known constructions without recourse to girder construction because of bending stresses caused by non-uniform rise and fall of the water level.

Further, as the size of such rigid float units is increased they become increasingly ponderous and their transportation from the fabrication plant to the installation site become more difficult.

An object of the present invention is to provide an improved floating wharf unit which can be constructed in longer sections without a disproportionate increase in weight or use of beams or girders for coping wtih stresses produced by undulating water or wave action.

Another object is to provide an improved wharf unit which provides an interval or space between individual pontoons, whereby lateral stress on the composite wharf due to water currents is reduced.

A further object is to provide a floating wharf unit which can be readily conjoined to other similar float units to build up a composite wharf of any desired configuration or length with simple and economical tie members.

Still another object is to simplify the construction of concrete floating wharf units by casting separately a plurality of concrete pontoons and a concrete deck slab and thereafter uniting them, either at the fabrication plant or at the site of installation, so that the individual elements of the unit can be more easily transported.

The invention further seeks to effect economy in the construction and assembly of the elements of the float units.

In summary, according to the invention each float unit comprises two or more independently cast concrete pontoons spaced apart longitudinally and connected by a horizontal, resilient deck slab of concrete which is fixed rigidly to the several pontoons and provides a deck or walk-way above the surface of the water, on which the boats may be approached and to which the boats may be moored. The deck slab is advantageously made resilient by forming it of high-density concrete and embedding therein longitudinal tensioning rods which prestress the concrete longitudinally. Additional metal reinforcing rods may be employed as described hereinafter.

The invention will be described in greater detail with reference to the accompanying drawings which form a part of this specification and show certain illustrative embodiments, wherein:

FIGURE 1 is an isometric view of a float unit according to the invention;

FIGURE 2 is a plan view of two float units of different sizes and outlines conjoined to form a wharf;

Figure 9:
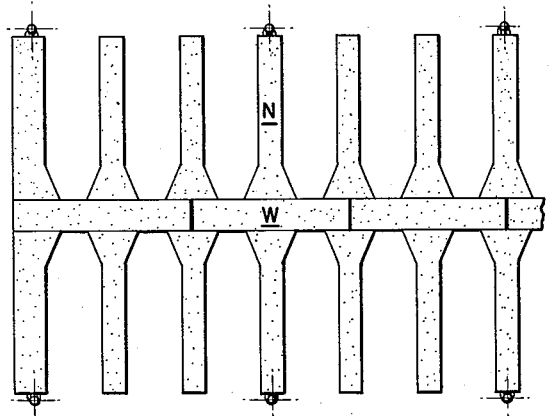
Figure 5:
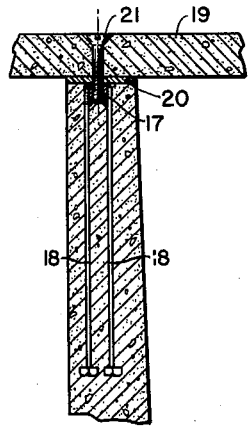
Figure 3:
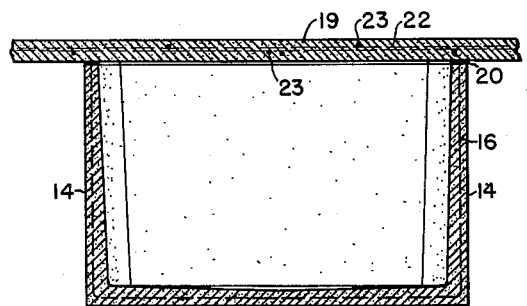
Figure 4:
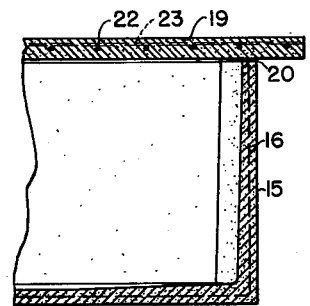
Figure 6:
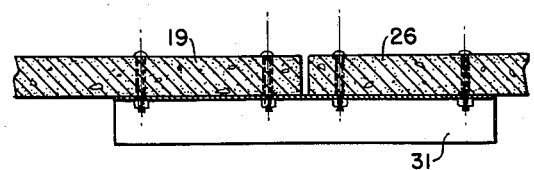
Figure 7:
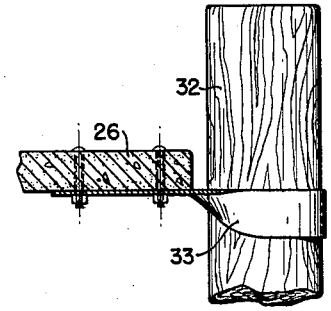
Figure 8:
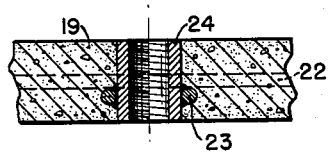

FIGURES 3 and 4 are transverse and longitudinal sectional views, taken on the lines 3—3 and 4—4, respectively, of FIGURE 2 showing the pontoon and deck and drawn to an enlarged scale;

FIGURE 5 is a further enlarged fragmentary sectional view taken on the line 5—5 of FIGURE 2 showing the means for securing the deck slab to the pontoon;

FIGURES 6 and 7 are fragmentary sectional views, taken on the lines 6—6 and 7—7, respectively, of FIGURE 2 showing the deck slab and certain connections thereto;

FIGURE 8 is an enlarged sectional view through a central part of the deck slab showing the ferrule for attaching a threaded member by which the unit can be lifted;

FIGURE 9 is a plan view of a composite wharf comprising a plurality of conjoined float units, shown in a reduced scale; and FIGURE 10 is a plan view of fragments of two conjoined float units illustrating a modified outline of the deck slab which is suitable for attaching one float unit obliquely to another.

Referring to FIGURES 1–9, each float unit comprises a plurality, e.g., two pontoons 11, 12, spaced apart longitudinally and adapted to be partially immersed in water. Each pontoon is substantially rectangular in plan and is cast monolithically of water-proof concrete to have a bottom 13, and upright side walls 14 and end walls 15, all reinforced with wire mesh 16. It is preferred to make the thicknesses of the bottom and walls non-uniform as shown, tapering horizontally and upwardly from the margins of the bottom, where the greatest bending stress occurs. The upright walls terminate in upper edges which are flat and coplanar and these edges are advantageously cast or ground to form sealing faces. These walls have internally threaded nuts 17 (FIGURE 5) embedded and anchored therein by pencil rod anchors 18 to which they are welded.

The several pontoons of a single float unit are interconnected at the top by a horizontal deck slab 19 which is sealed to the flat upper edges of the pontoon walls by suitable sealing means, such as an epoxy resin (which further serves to secure the slab to the pontoons) or a gasket, as indicated at 20. When a gasket is used and, optionally, when a resinous cement is used, the slab is fastened to the pontoons by means of flathead bolt screws 21 which extend downwards through holes formed in the slab and are in threaded engagement with the nuts 17. These screws are recessed and flush with the deck surface.

The deck slab is precast of high-density concrete and prestressed by longitudinal metal rods or cables 22 which are embedded at the mid-height of the slab and bonded or anchored thereto. These rods or cables are under high tension and maintain the slab under longitudinal compression, as is understood in the prestressed concrete art. The slab thereby has considerable resiliency and can be flexed in the vertical longitudinal plane like a spring-board. The slab advantageously also has transverse metal reinforcing rods 23 embedded and bonded therein. Because of the longitudinal flexibility of the deck slab the several pontoons of the same float unit can undergo relative motion, whereby wave or other forces which act on one pontoon produce some flexing of the part of the deck slab spanning the interval between pontoons and the float unit acts elastically. In contrast, if a rigid or essentially rigid slab were employed, it would be necessary to reinforce it sufficiently to insure rigidity between the pontoons and avoid damage to the slab; this would necessitate a heavier construction, e.g., the use of a truss or beam. This flexibility is further useful in providing overall flexibility to the composite wharf, as will be explained.

To permit the float unit to be hoisted by a crane a plurality of internally threaded ferrules 24 (FIGURES 2 and 8) are embedded in the slab and welded to anchoring rods, such as the transverse rods 23 before casting. They are adapted to receive the threaded ends of cable connectors (not shown) to which the hoisting cables are attached. Suitable mooring devices, indicated at 25, may be bolted to the slab.

The pontoons are preferably situated inwardly from the ends of the deck slab as shown. One convenient arrangement is to have the slab project longitudinally beyond the pontoons by distances about half of the interval between the pontoons of the unit, so that when a number of float units are connected in end-to-end relation the pontoons will be spaced at approximately equal intervals. Moreover, the deck slab is preferably made somewhat wider than the pontoons to facilitate bolting tie straps and to prevent impact on the pontoons by boats.

The deck slabs may have various outlines having regard to their function. Thus, as is shown in FIGURE 2, the deck slab 19 is wide and rectangular, and is suitable to provide a principal way for approaching several narrower berthing piers or fingers, one of which is shown with a deck slab 26. The latter unit is constructed as previously described, save that the pontoons 27, 28 are longer and narrower and that the deck slab has lateral margins 29 which diverge toward one end to provide an elongated terminal edge 30. The latter is secured in juxtaposed relation to the side edge of the deck slab 19 by connecting straps or tie members 31 (FIGURES 2 and 6) formed from structural angles and bolted to the under sides of the slabs 19 and 26.

FIGURE 9 shows how a composite wharf can be built up by uniting a required number of such narrow float units N perpendicularly to a linear series of wider, shorter float units W, the latter being connected end-to-end by connecting straps as described.

The float units can be fastened to stationary, vertical piles 32 by anchor rings, shown at 33 (FIGURES 2 and 7), which are bolted to the under side of the deck slab. The anchor ring surrounds the pile with sufficient peripheral clearance to permit the floating unit to rise and fall with the tide or when loaded.

The composite wharf is afforded a slight degree of flexibility at the joints between float units because the straps 31 can flex a little. Because they do not extend along the slabs for extended distances but are bolted only adjacently the margins of the slabs, the latter are left free to flex resiliently, thereby preventing excessive stresses on the conjoined units when one is moved by wave action or loading.

FIGURE 10 shows a modification wherein the narrow float units are attached to the wide units obliquely to the longitudinal axis of the latter. In this embodiment the wide float unit W is constructed as previously described. The terminal part T of the narrow float unit, having a plurality of pontoons of which only the pontoon 34 appears, extends beyond the pontoon to form a projection having a terminal edge 35 which is inclined obliquely, e.g., at an angle between 20° and 80° to the axis of the float unit. This narrow float unit is secured to the float unit W by straps as previously described.

I claim as my invention:

1. A floating wharf unit comprising a pair of concrete pontoons spaced apart longitudinally and a common, horizontal, resilient deck slab rigidly secured directly to the upper portions of both said pontoons, said slab being formed of concrete and including longitudinal, tensioned means maintaining said slab under longitudinal compression, whereby said pontoons are capable of relative motion by flexure of said slab.

2. In combination with the floating wharf unit of claim 1, a plurality of internally threaded ferrules embedded and anchored therein, said ferrules being adapted to receive threaded support members for lifting the wharf unit.

3. A floating wharf unit comprising a pair of pontoons spaced apart longitudinally, each of said pontoons being formed of reinforced concrete and having a bottom and side and end walls, said side and end walls having coplanar upper edges, and a common, horizontal, resilient deck slab overlying all the said upper wall edges of both pontoons in sealed relation and rigidly secured to the pontoons, said slab being formed of concrete and containing longitudinal prestressing means for maintaining the slab under longitudinal compression, whereby said pontoons are capable of relative motion by flexure of said slab.

4. A floating wharf unit according to claim 3 wherein said slab extends longitudinally beyond at least one of said pontoons to form a projection, the terminal edge of said projection being inclined to the longitudinal axis of the slab at an angle between about 20° and 80° for juxtaposition to the deck slab of another floating wharf unit.

5. A floating wharf unit according to claim 3 wherein at least the end portion of said slab has lateral margins which diverge toward the end of the slab to provide a transverse, terminal edge which is longer than the width of the adjacent pontoon for juxtaposition with the deck slab of another floating wharf unit.

6. A floating wharf unit according to claim 3 wherein said deck slab is secured to each of said pontoons by a plurality of screws extending downwards through holes formed in the slab, each said pontoon having embedded within the walls thereof a plurality of nuts which are in threaded engagement with said screws.

7. A floating wharf unit comprising a pair of pontoons spaced apart longitudinally, each said pontoon being formed of reinforced concrete and having a bottom and upwardly tapered side and end walls, said walls having coplanar upper edges and containing internally threaded nuts anchored therein, sealing means on said upper edges, and a common, horizontal, resilient deck slab overlying all the said upper wall edges of both said pontoons in engagement with said sealing means and rigidly secured to said pontoons by screws which extend downwards through holes formed in the slab and are in threaded engagement with said nuts, said slab being formed of concrete and containing embedded therein at the mid-height thereof and secured to the slab a plurality of longitudinal, tensioned tension means maintaining said slab under longitudinal compression, said slab containing further a plurality of transverse metal reinforcing means, whereby said pontoons are capable of relative motion by flexure of said slab.

References Cited in the file of this patent

UNITED STATES PATENTS

| | | |
|---|---|---|
| 1,080,499 | Stoval | Dec. 2, 1913 |
| 1,858,790 | Boettcher | May 17, 1932 |
| 2,590,685 | Coff | Mar. 25, 1952 |
| 2,620,651 | Brauer | Dec. 9, 1952 |
| 2,833,186 | Dobell | May 6, 1958 |
| 2,857,872 | Usab | Oct. 28, 1958 |
| 2,879,735 | Pointer | Mar. 31, 1959 |
| 2,867,111 | Youtz | June 6, 1959 |

OTHER REFERENCES

Nature, May 31, 1952, pp. 901–905.